(12) United States Patent
Klinghult et al.

(10) Patent No.: US 8,421,483 B2
(45) Date of Patent: Apr. 16, 2013

(54) TOUCH AND FORCE SENSING FOR INPUT DEVICES

(75) Inventors: Gunnar Klinghult, Lund (SE); Mats Kleverman, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1093 days.

(21) Appl. No.: 12/138,782

(22) Filed: Jun. 13, 2008

(65) Prior Publication Data

US 2009/0309616 A1 Dec. 17, 2009

(51) Int. Cl.
*G01R 27/26* (2006.01)
*G06F 3/041* (2006.01)
*G06F 3/045* (2006.01)

(52) U.S. Cl.
USPC ............ 324/686; 324/658; 345/173; 345/174

(58) Field of Classification Search .................. 324/686, 324/658; 345/173, 174
See application file for complete search history.

(56) References Cited

U.S. PATENT DOCUMENTS

| | | | |
|---|---|---|---|
| 4,555,953 A | 12/1985 | Dario et al. | |
| 6,002,389 A | 12/1999 | Kasser | |
| 6,459,424 B1 * | 10/2002 | Resman | 345/173 |
| 6,492,979 B1 * | 12/2002 | Kent et al. | 345/173 |
| 7,154,481 B2 * | 12/2006 | Cross et al. | 345/173 |
| 7,746,325 B2 * | 6/2010 | Roberts | 345/173 |
| 2001/0026636 A1 | 10/2001 | Mainguet | |
| 2003/0234769 A1 | 12/2003 | Cross et al. | |
| 2008/0007532 A1 | 1/2008 | Chen | |
| 2010/0066686 A1 | 3/2010 | Joguet et al. | |

FOREIGN PATENT DOCUMENTS

| | | |
|---|---|---|
| EP | 1 109 382 A2 | 6/2001 |
| WO | WO 98/06079 | 2/1998 |
| WO | WO 03/088135 A2 | 10/2003 |
| WO | WO 2008/000964 A1 | 1/2008 |

OTHER PUBLICATIONS

"Polyvinylidene fluoride", http://en.wikipedia.org/wiki/Polyvinylidene_fluoride, Jun. 13, 2008 (Print date), 2 pages.

Lee, C. S. et al.: Multifunctional transducer using poly (vinylidene fluoride) active layer and highly conducting poly (3,4-ethylenedioxythiophene) electrode: Actuator and generator; Applied Physics Letters, vol. 85, No. 10, Sep. 2004, pp. 1841-1843.

Dargahi, J.: Piezoelectric and pyroelectric transient signal analysis for detection of the temperature of a contact object for robotic tactile sensing; Sensors and Actuators A 71 (1998), pp. 89-97.

(Continued)

*Primary Examiner* — Amy He
(74) *Attorney, Agent, or Firm* — Snyder, Clark, Lesch & Chung, LLP

(57) ABSTRACT

A device may include a first layer, a second layer, a third layer, a capacitive sensing component coupled to the first layer, and a force sensing component coupled to the first layer and the third layer and configured to detect the amount of force applied to the second layer. A method may include monitoring capacitance and voltage at one or more input sensors configured to detect changes in capacitance and to detect changes in applied force, detecting a change in capacitance, activating a capacitance response in response to detecting a change in capacitance, detecting a change in voltage, and activating a force response in response to detecting a change in voltage.

13 Claims, 9 Drawing Sheets

OTHER PUBLICATIONS

Niederhauser, J. J. et al.: Transparent ITO coated PVDF transducer for optoacoustic depth profiling; Optics Communications 253 (2005), pp. 401-406.

Evans et al., "FR016: Constructing a pyroelectric/piezoelectric sensor using a PNZT capacitor", Applications of Ferroelectrics, Feb. 23, 2008, 4 pages, XP031367331.

Notification of Transmittal of the International Search Report and the Written Opinion of the International Searching Authority, or the Declaration corresponding to PCT/IS2008/055233, mailed Jun. 24, 2010, 25 pages.

Partial International Search Report corresponding to PCT/IB2008/055233, mailed Apr. 9, 2010, 5 pages.

* cited by examiner

TOUCH AND FORCE SENSING FOR INPUT DEVICES

BACKGROUND

Many electronic devices use touch screens for user input. A touch screen sends a signal to the device when a user touches it with, for example, a finger. Currently, many touch screens used in various devices are resistive touch screens. Resistive touch screens may be applied to many types of displays and are relatively inexpensive. A drawback with resistive touch screens is that the resistive touch screen acts as a simple switch, which limits the amount of control a user can exercise through a touch screen input device.

Furthermore, many electronic devices, such as mobile communication devices, tend to have limited input and output capabilities due to their relatively small size. For example, many mobile communication devices have a fairly small visual display and a limited number of keys for user input. Given the increasing array of features included in mobile communication devices, this limited ability to interact with the mobile communication device can be increasingly troublesome.

SUMMARY

According to one aspect, a device is provided. The device may include a first layer, a second layer, a third layer, a capacitive sensing component coupled to the first layer, and a force sensing component coupled to the first layer and the third layer and configured to detect the amount of force applied to the second layer.

Additionally the second layer may include a piezoelectric, optically transparent material.

Additionally, the second layer may include one of polyvinylidene fluoride, poly(vinylidene-trifluoroethylene), poly(vinylidene-tetrafluoroethylene), or two or more of polyvinylidene fluoride, poly(vinylidene-trifluoroethylene), and poly(vinylidene-tetrafluoroethylene).

Additionally, the first and third layer may include a conductive, optically transparent material.

Additionally, the first and third layers may include one of indium tin oxide, aluminum-doped zinc oxide, carbon nanotubes, Poly(3,4-ethylenedioxythiophene), or Poly(3,4-ethylenedioxythiophene)-poly(styrenesulfonate).

Additionally, the force sensing component may be configured to execute a plurality of actions, where each of the plurality of actions is executed in response to a different amount of force detected.

Additionally the plurality of actions may correspond to a different degree of the same action.

Additionally, the force sensing component may be configured to control an intensity of an action or the number of objects to include in the action.

Additionally, an input device may include an array of the devices.

Additionally, a mobile terminal may include the input device.

Additionally, the input device may be a button, a touch screen, a keyboard, a key pad, or a scroll wheel.

According to another aspect, another device is provided. The device may include a sensing layer, a voltage response analysis component coupled to the sensing layer and configured to analyze a voltage response of the sensing layer, a piezoelectric response component coupled to the voltage response analysis component to activate a first action based on determining that a voltage response is the result of a piezoelectric response, and a pyroelectric response component coupled to the voltage response analysis component to activate a second action based on determining that a voltage response is the result of a pyroelectric response.

Additionally, the piezoelectric response component may be configured to control the intensity of the first action or the number of objects to include in the first action based on the voltage response.

Additionally, the pyroelectric response component may be configured to control the intensity of the second action or the number of objects to include in the second action based on the voltage response.

According to another aspect, a method is provided. The method may include monitoring capacitance and voltage at one or more input sensors configured to detect changes in capacitance and to detect changes in applied force, detecting a change in capacitance, activating a capacitance response in response to detecting a change in capacitance, detecting a change in voltage, and activating a force response in response to detecting a change in voltage.

Additionally, activating a force response may include activating a press event in response to detecting an increase in voltage, and activating a non-press event in response to detecting a decrease in voltage.

Additionally, activating a press event followed by activating a non-press event causes a single-click action to be performed, and where activating a first press event followed by a non-press event, followed by a second press event within a particular time period causes a double-click action to be performed.

Additionally, the method may further include adjusting a sensitivity of the sensor by one of changing an area of the sensor, changing a thickness of the sensor, or changing a gain of an amplifier configured to amplify a signal from the sensor.

Additionally, detecting a change in voltage may include determining whether the change in voltage is consistent with a piezoelectric response or a pyroelectric response, activating a first function based on determining that the change in voltage is consistent with a pyroelectric response, and activating a second function based on determining that the change in voltage is consistent with a piezoelectric response, where the first function is different from the second function.

Additionally, activating the capacitance response may include one of activating a button, a key or a link, lighting a display, updating contents being displayed, silencing a ring tone, or answering a call.

BRIEF DESCRIPTION OF THE DRAWINGS

Reference is made to the attached drawings, where elements having the same reference number designation may represent like elements throughout.

DETAILED DESCRIPTION

The following detailed description refers to the accompanying drawings. The same reference numbers in different drawings identify the same or similar elements. Also, the following detailed description does not limit the invention. Instead, the scope of the invention is defined by the appended claims and equivalents.

Exemplary implementations will be described in the context of a mobile communication device. It should be understood that a mobile communication device is an example of a device that can employ an input device described herein, and should not be construed as limiting of the types or sizes of devices or applications that can include an input device, as described herein. For example, input devices consistent with the principles described herein may be used on a desktop device (e.g., a personal computer or workstation), a laptop computer, a personal digital assistant (PDA), a media playing device (e.g., an MPEG audio layer 3 (MP3) player, a digital video disc (DVD) player, a video game playing device), a household appliance (e.g., a microwave oven and/or appliance remote control), an automobile radio faceplate, a television, a computer screen, a point-of-sale terminal, an automated teller machine, an industrial device (e.g., test equipment, control equipment) or any other device that requires user input.

Exemplary Device

Figure 1:
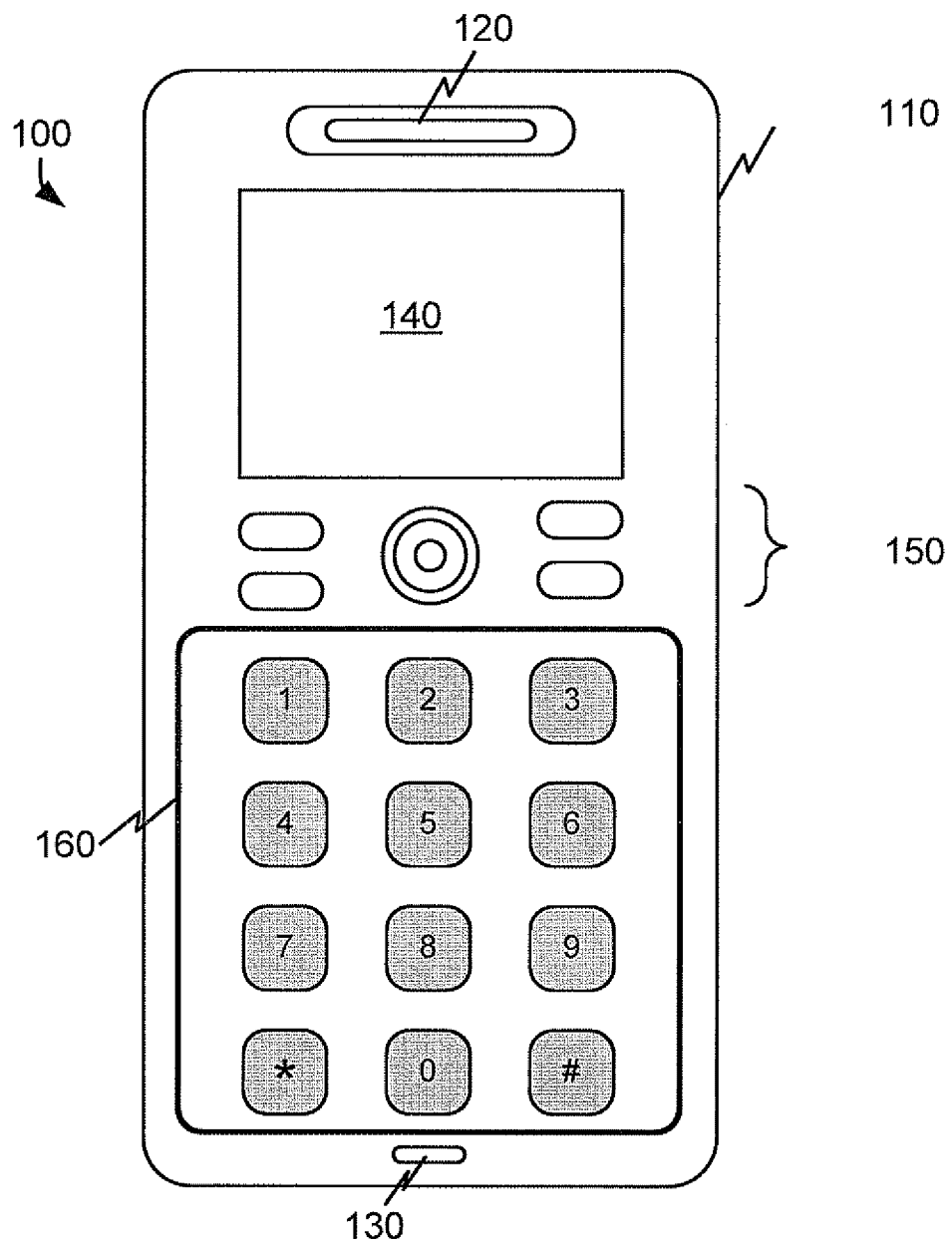
FIG. 1 is a diagram of an exemplary mobile terminal in which methods and systems described herein may be implemented.

FIG. 1 is a diagram of an exemplary mobile terminal 100 in which methods and systems described herein may be implemented. As used herein, the term "mobile terminal" may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/Intranet access, Web browser, organizer, calendar and/or a global positioning system (GPS) receiver; or a laptop and/or palmtop receiver or other appliance that includes a radiotelephone transceiver. Mobile terminals may also be referred to as "pervasive computing" devices. Mobile terminal 100 may also include media playing capability. As described above, it should also be understood that systems and methods described herein may also be implemented in other devices that require user input, with or without including various other communication functionality.

Referring to FIG. 1, mobile terminal 100 may include a housing 110, a speaker 120, a microphone 130, a display 140, control buttons or keys 150, and keypad 160. Housing 110 may protect the components of mobile terminal 100 from outside elements. Speaker 120 may provide audible information to a user of mobile terminal 100. Microphone 130 may receive audible information from the user. Display 140 may be a color display, such as a red, green, blue (RGB) display, a monochrome display or another type of display. Control buttons 150 may permit the user to interact with mobile terminal 100 to cause mobile terminal 100 to perform one or more operations, such as place a telephone call, play various media, etc. For example, control buttons 150 may include a dial button, hang up button, play button, etc. Keypad 160 may include a telephone keypad used to input information in mobile terminal 100.

In an exemplary implementation, control buttons 150 and keypad 160 may be part of display 140. That is, display 140, control buttons 150 and keypad 160 may be part of an optical touch screen display. In addition, in some implementations, different control buttons and keypad elements may be provided based on the particular mode in which mobile terminal 100 is operating. For example, when operating in a cell phone mode, a telephone keypad and control buttons associated with dialing, hanging up, etc., may be displayed in display 140. In other implementations, control buttons 150 and/or keypad 160 may not be part of display 140 (i.e., may not be part of an optical touch screen display) and may include input devices used to input information to mobile terminal 100.

Figure 2:
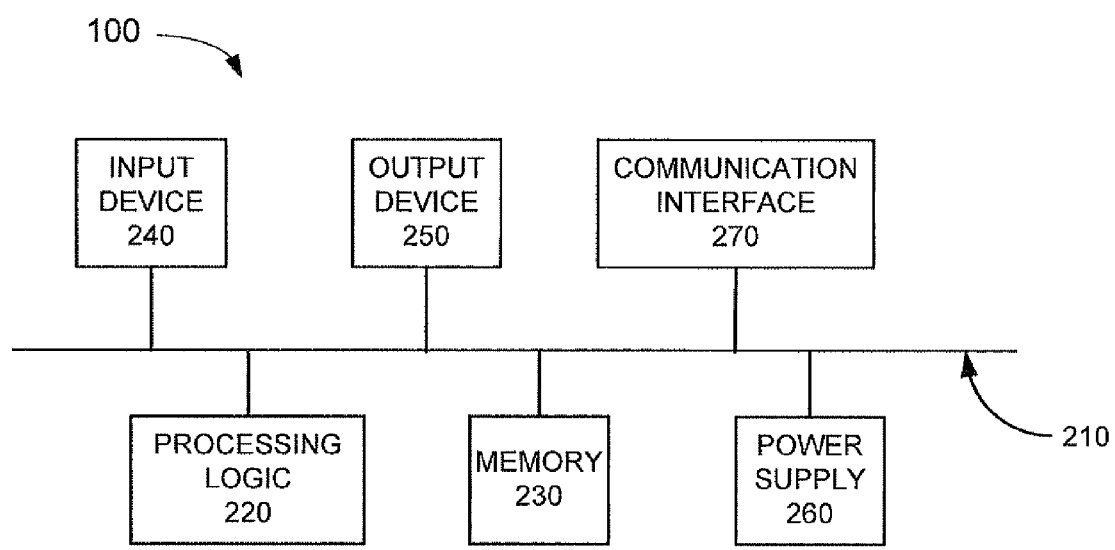
FIG. 2 is a diagram illustrating components of the mobile terminal of FIG. 1 according to an exemplary implementation.

FIG. 2 is a diagram illustrating components of mobile terminal 100 according to an exemplary implementation. Mobile terminal 100 may include bus 210, processing logic 220, memory 230, input device 240, output device 250, power supply 260 and communication interface 270. Mobile terminal 100 may be configured in a number of other ways and may include other or different elements. For example, mobile terminal 100 may include one or more modulators, demodulators, encoders, decoders, etc., for processing data.

Bus 210 permits communication among the components of mobile terminal 100.

Processing logic 220 may include a processor, microprocessor, an application specific integrated circuit (ASIC), field programmable gate array (FPGA) or the like. Processing logic 220 may execute software instructions/programs or data structures to control operation of mobile terminal 100. In an exemplary implementation, processing logic 220 may include logic to control display 140. For example, processing logic 220 may determine whether a user has provided input to a touch screen portion of display 140, as described in detail below.

Memory 230 may include a random access memory (RAM) or another type of dynamic storage device that may store information and/or instructions for execution by processing logic 220; a read only memory (ROM) or another type of static storage device that may store static information and/or instructions for use by processing logic 220; a flash memory (e.g., an electrically erasable programmable read only memory (EEPROM)) device for storing information and/or instructions; and/or some other type of magnetic or optical recording medium and its corresponding drive. Memory 230 may also be used to store temporary variables or other intermediate information during execution of instructions by processing logic 220. Instructions used by processing logic 220 may also, or alternatively, be stored in another type of computer-readable medium accessible by processing logic 220. A computer-readable medium may include one or more logical or physical memory devices.

Input device 240 may include mechanisms that permit an operator to input information to mobile terminal 100, such as touch screen display 140, microphone 130, a keyboard, a mouse, a pen, voice recognition and/or biometric mechanisms, etc. For example, as discussed above, all or a portion of display 140 may function as a touch screen input device for inputting information to mobile terminal 100.

Output device 250 may include one or more mechanisms that output information from mobile terminal 100, including a display, such as display 140, one or more speakers, such as speaker 120, etc. Power supply 260 may include one or more batteries or other power source components used to supply power to components of mobile terminal 100. Power supply 260 may also include control logic to control application of power from power supply 260 to one or more components of mobile terminal 100.

Communication interface 270 may include any transceiver-like mechanism that enables mobile terminal 100 to communicate with other devices and/or systems. For example, communication interface 270 may include a modem or an Ethernet interface to a LAN. Communication interface 270 may also include mechanisms for communicating via a network, such as a wireless network. For example, communication interface 270 may include one or more radio frequency (RF) transmitters, receivers and/or transceivers. Communication interface 270 may also include one or more antennas for transmitting and receiving RF data.

Mobile terminal 100 may provide a platform for a user to make and receive telephone calls, send and receive electronic mail or text messages, play various media, such as music files, video files, multi-media files, or games, and execute various other applications. Mobile terminal 100 may also perform processing associated with display 140 operating as a touch screen input device. Mobile terminal 100 may perform operations in response to processing logic 220 executing sequences of instructions contained in a computer-readable storage medium, such as memory 230. Such instructions may be read into memory 230 from another computer-readable medium or another device via, for example, communication interface 270. In alternative embodiments, hard-wired circuitry may be used in place of or in combination with software instructions to implement processes described herein. Thus, implementations described herein are not limited to any specific combination of hardware circuitry and software.

Exemplary Input Device

As described herein, input device 240 may include one or more sensors, such as an array of sensors. When input device 240 takes the form of a touch screen display, display 140 may include an array of sensors covering part of, or the whole area of, display 140. Any arrangement of sensors may be used. For example, the array of sensors may include (a) a rectangular array of x rows and y columns of sensors, (b) x rows of sensors, where each row is a bar spanning the height of display 140, (c) y columns of sensors, where each column is a bar spanning the width of display 140, or (d) any combination thereof, where different parts of display 140 may have a different arrangement of sensors. When input device 240 takes the form of a keyboard, a key pad, or another arrangement of input keys, each key might include one or more sensors.

Figure 3A:
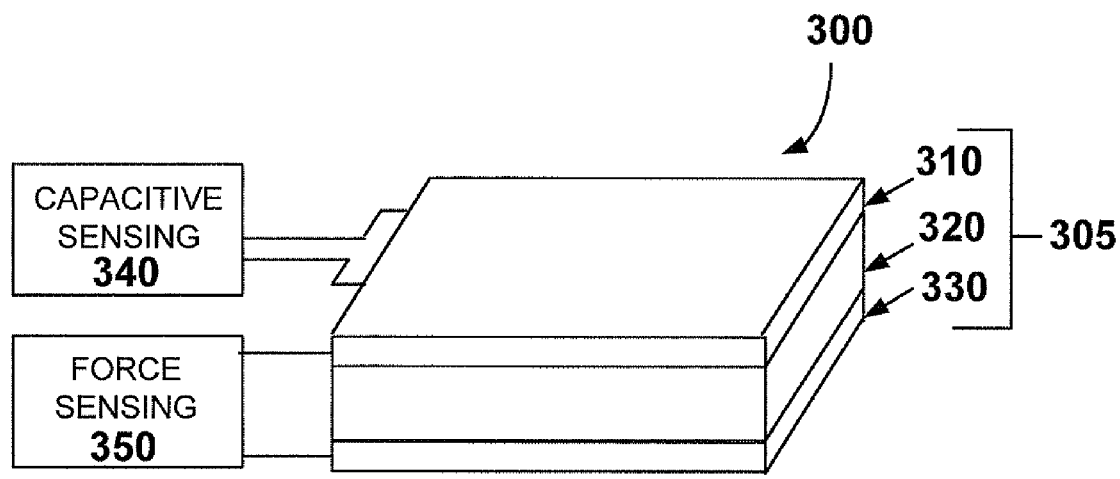
FIG. 3A illustrates a first exemplary input device according to an exemplary implementation.

Referring to FIG. 3A, device 300 for sensing user input may be provided. Device 300 may include a combined analog force and touch sensor 305. Sensor 305 may include top layer 310, force sensing layer 320, and bottom layer 330. Sensor 305 may be configured for combined capacitive touch sensing and force sensing. Device 300 may be included in, for example, a button, a touch pad, a touch screen, a keyboard, a key pad, or a scroll wheel.

Top layer 310 and bottom layer 330 may be electrode layers, and include the same material for both layers, or may include a different material for each layer. In one implementation, top layer 310 and bottom layer 330 may include a conductive and optically transparent material, such as indium tin oxide (ITO), aluminum-doped zinc oxide, carbon nanotubes, Poly(3,4-ethylenedioxythiophene) (PEDOT), or Poly (3,4-ethylenedioxythiophene)-poly(styrenesulfonate) (PEDOT:PSS). In another implementation, where optical transparency is not required, top layer 310 and bottom layer 330 may include materials such as silver, copper, or carbon.

Force sensing layer 320 may include any piezoelectric material. An exemplary piezoelectric material used may include a piezoelectric polymer material, such as polyvinylidene fluoride (PVDF). Other piezoelectric polymeric materials may be used, such as a copolymer of vinylidene and trifluoroethylene, known as poly(vinylidene-trifluoroethylene), or P(VDF-TrFE), or a copolymer of vinylidene and tetrafluoroethylene, known as poly(vinylidene-tetrafluoroethylene), or P(VDF-TFE). Copolymerizing VDF improves piezoelectric response by improving the crystallinity of the resulting polymer. A composite piezoelectric material may be used by incorporating piezoelectric ceramic particles into a piezoelectric polymer material. For example, ceramic particles of lead zirconium titanate ($Pb[Zr_xT_{1-x}]O_3$), barium titanate ($BaTiO_3$), lithium niobate ($LiNbO_3$), or bismuth ferrite ($BiFeO_3$) may be used in a matrix of PVDF, P(VDF-TFE), or P(VDF-TrFE), to improve piezoelectric sensitivity. In implementations where combined analog force and touch sensor 305 is part of a display, such as a touch screen, a transparent piezoelectric material, such as PVDF, may be used.

Capacitive sensing component 340 may be coupled to top layer 310, and may include a device capable of processing signals from top layer 310. Capacitive sensing component 340 may include an amplifier for amplifying signals from top layer 310 and may be configured to detect changes in capacitance in top layer 310 and activate a capacitive response action in mobile terminal system 100 in response to detecting the change in capacitance. Capacitive sensing component 340 may be coupled to an array of sensors 305 and configured to determine which particular sensors in the array of sensors have been activated by a user based on the change in capacitance in the particular sensors. The particular action or series of actions activated by capacitive sensing component 340 in response to detecting a change in capacitance in a particular sensor included in input device 240 may be predetermined during manufacture, set by the user, or depend on an application being executed by mobile terminal 100. Capacitive sensing component 340 may be implemented within processing logic 220, or as a processor, microprocessor, an application specific integrated circuit (ASIC), field programmable gate array (FPGA), or the like, within input device 240.

Force sensing component 350 may be coupled to top layer 310 and bottom layer 330, to detect changes in voltage across force sensing layer 320. Force sensing component 350 may be configured to measure the amount of force applied to force sensing layer 320 based on the change in voltage detected and activate a force response in mobile terminal system 100 in response to detecting a change in force and may include an amplifier for amplifying the signal from sensor 305. Force sensing layer 350 may be coupled to an array of sensors and configured to determine which particular sensors in the array of sensors have been activated by a user based on the change in voltage in the particular sensors. The sensitivity of sensor 305 may be adjusted by adjusting the gain of the amplifier. The particular action or series of actions activated by force sensing component 350 in response to detecting a change in voltage in a particular sensor included in input device 240 may be predetermined during manufacture, set by the user, or depend on an application being executed by mobile terminal 100. The force response of force sensing component 350 may be configured to control an intensity of an action or the number of objects to include in the action based on the amount in the change of voltage and therefore based on the amount of force detected. Force sensing component 350 may be implemented within processing logic 220, or as a processor, microprocessor, an application specific integrated circuit (ASIC), field programmable gate array (FPGA), or the like, within input device 240.

Figure 3B:
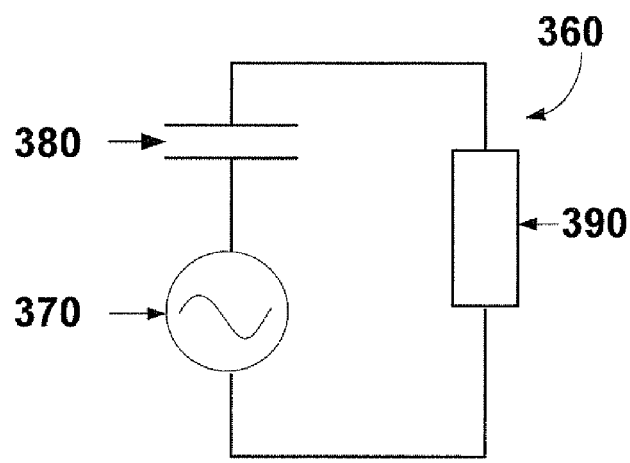
FIG. 3B is a diagram schematically illustrating an equivalent circuit of the device of FIG. 3A.

FIG. 3B is a diagram schematically illustrating an equivalent circuit 360 of the force sensing component of device 300 of FIG. 3A. Equivalent circuit 360 may include capacitive element 380 representing the capacitance of sensor 305, resistance element 390 representing the input resistance of an amplifier included in force sensing component 350, and signal generating and measuring component 370 representing force sensing component 350. It should be appreciated that the time of decay in voltage response as an applied force is held constant across force sensing layer 320, may be controlled by adjusting capacitance 380 and input resistance 390, which together determine the RC constant of equivalent circuit 360.

Figure 4:
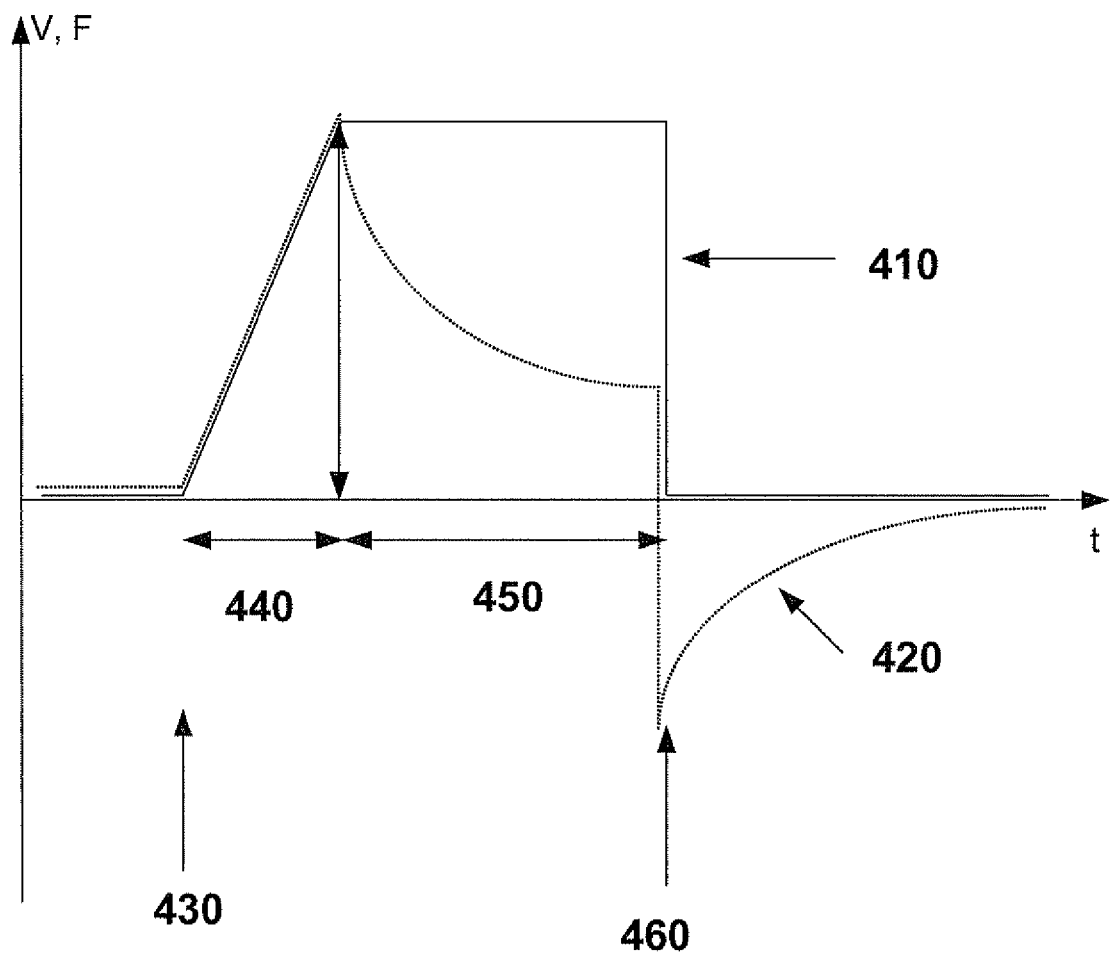
FIG. 4 illustrates an exemplary voltage response curve of an exemplary sensor device described herein.

FIG. 4 illustrates an exemplary voltage response curve 430 of sensor 305 in response to applied force. Force curve 410 shows force is applied, starting from zero, or a non-force condition, and increases linearly over time in first time period 440, is held at a constant value for a period of time in second time period 450, and suddenly drops back to zero on release at 460. This corresponds to a user touching sensor 305, applying increasing pressure with a finger, holding the pressure for a period of time, and then removing the finger from sensor 305. Voltage curve 420 illustrates the voltage response during each period. As pressure steadily increases during period 440, voltage steadily rises linearly in response to increasing pressure. Once the force stops increasing and is held at a constant value during period 450, the voltage remains constant and then drops approximately exponentially, since in a closed circuit any dipole moment created in a piezoelectric material will be discharged over time. As pressure is released and the force drops back to zero at 460, a voltage bias occurs in the other direction in response to the change in force. The resulting negative bias returns to zero over time approximately exponentially.

In one implementation, only a force sensor may be used. If only a force sensor is desired, only force sensing layer 320 may be used, or force sensing layer 320 may be coated with a screening layer only. The screening layer may be top layer 310. The sensitivity of the sensor may be made high enough so that just a light touch of a user's finger or a pen will generate a detectable signal. If such a high sensitivity is not desired, the sensitivity can be set lower and the top layer on the sensor can be used for capacitive touch sensing, which will handle a first touch of a user to input device 240.

The sensitivity of the sensor may be controlled in several ways. The sensitivity may be increased by increasing the sensor area, or decreased by decreasing the sensor area. The sensitivity may be increased by increasing the thickness of force sensing layer 320, by, for example, using a thicker film or stacking several layers of films. The sensitivity may also be increased by increasing the gain of the amplifier, or decreased by decreasing the gain of the amplifier. Changing the area or thickness of the sensor will result in a higher signal to noise ratio, while changing the gain of the amplifier will not change the signal to noise ratio.

Figure 5A:
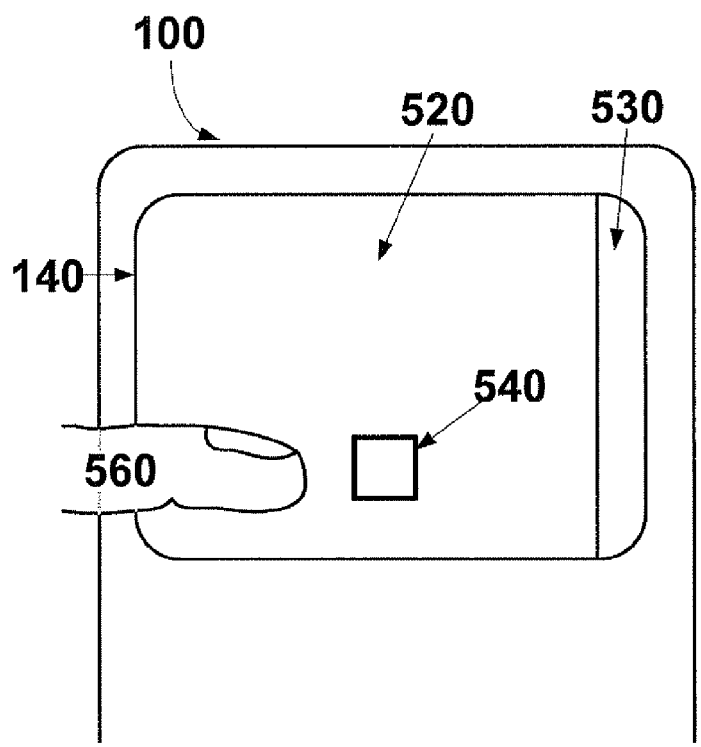
FIG. 5A illustrates a state of an exemplary mobile terminal in which methods and systems described herein may be implemented.

FIG. 5A illustrates a first state of exemplary mobile terminal 100 with display matrix 140 utilizing an array of sensors according to the systems and methods described herein. Display matrix 140 may have areas of different sensitivity that are determined during manufacture. For example, display matrix 140 may have areas utilizing different thicknesses of the sensing layer. Display area 520 may have one thickness, while display area 530 on the right side of the display, which may be used for scrolling through displayed contents, may have a sensing layer with a greater thickness. In another implementation, display matrix 140 may have areas in which the area of the individual sensors differs. Display area 520 may have an array of sensor elements in which each particular sensor element has a first area, while display area 530 may have an array of sensor elements in which each particular sensor element has a second area which is larger than the first area.

Figure 5B:
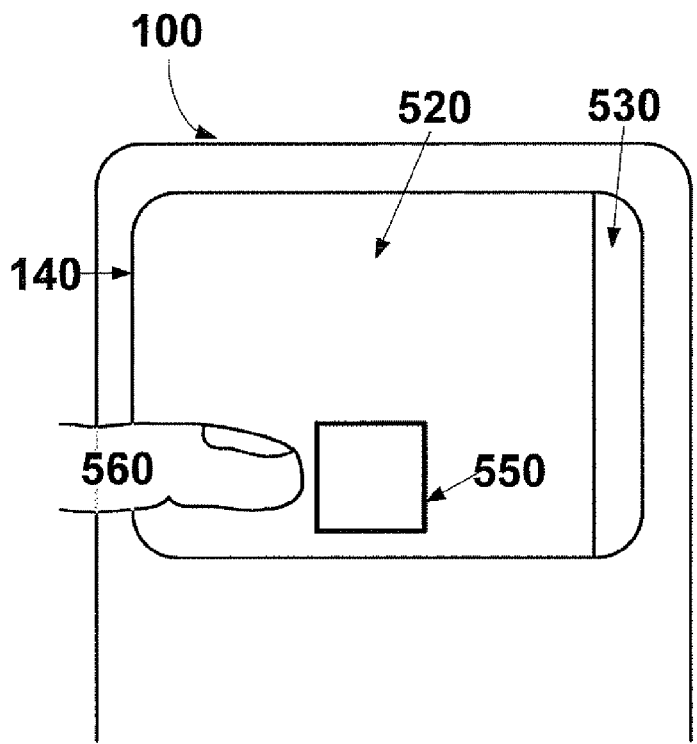
FIG. 5B illustrates a state of an exemplary mobile terminal in which methods and systems described herein may be implemented.

The sensitivity of the array of sensors on display matrix 140 may also be adjustable during use. For example, the area of the individual sensing elements of the array of sensors may be increased. The sensing area may be adjusted by the user or by a particular application running on mobile terminal 100. In FIG. 5A, user 560 activated sensor area 540 by pressing the area with a finger. FIG. 5B illustrates user 560 activating sensor area 550 after the sensitivity has been increased. The larger sensor area 550 may be obtained by, for example, recruiting more elements of the sensing array and treating the elements as one sensor by combining the outputs of the particular elements.

While an array of sensors is illustrated as implemented in a display, the principles described with reference to FIGS. 5A and 5B may be applied to any input device that includes sensor device 300.

Exemplary Processes

Figure 6:
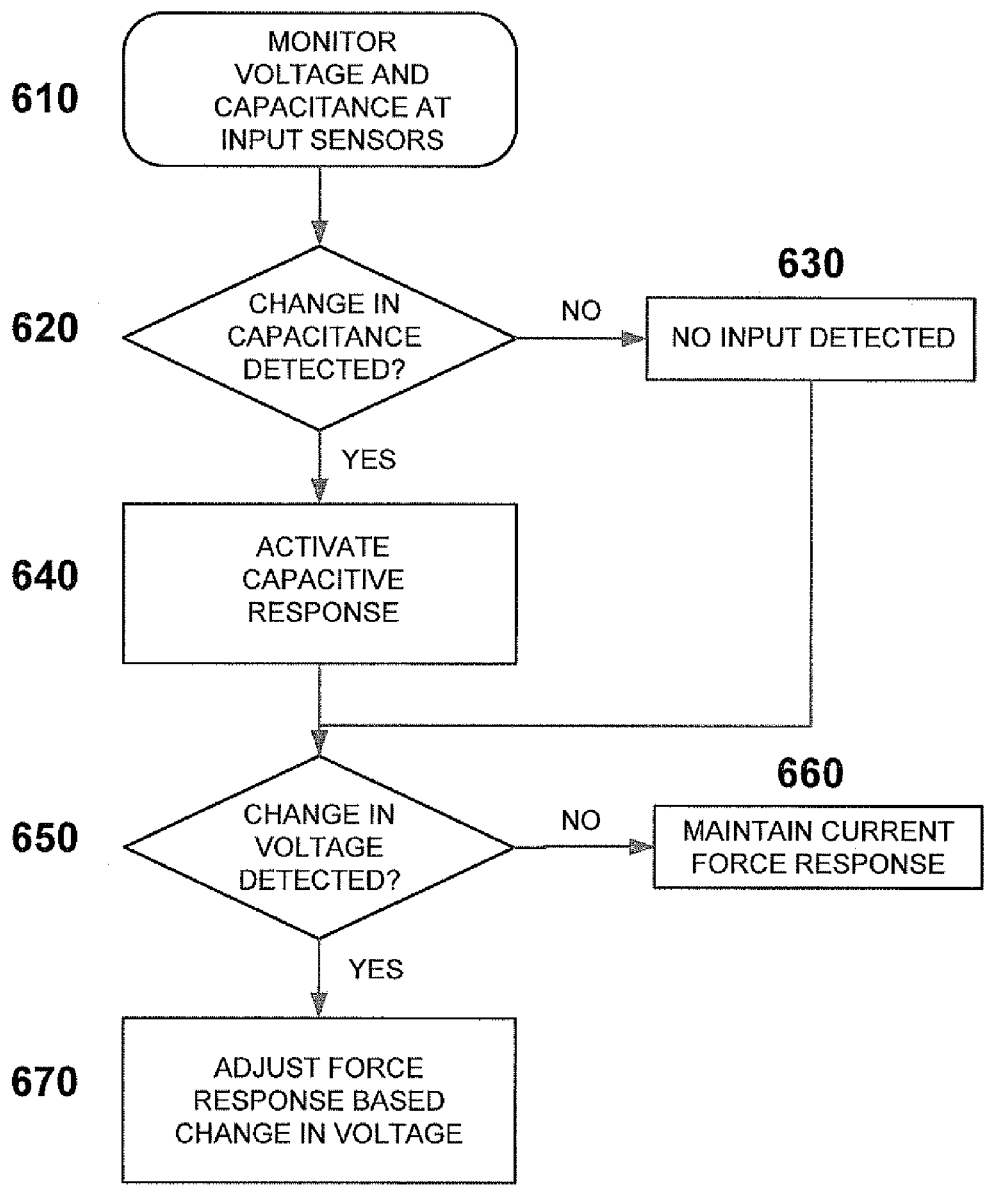
FIG. 6 is a flow diagram illustrating a first exemplary method according to an exemplary implementation.

FIG. 6 is a flow diagram illustrating processing by mobile terminal 100 in an exemplary implementation. One or more blocks may be performed by input device 240 or another mobile terminal. A voltage and capacitance of input sensors may be monitored (Block 610). Since touches on input device 240 may occur very quickly and very frequently, input device 240 may continuously monitor the capacitance and voltage of an input sensor. If no change in capacitance is detected (Block 620—no), no input was detected and no action will be taken (Block 630). If no change in capacitance is detected, a change in voltage may be checked for (Block 650). If a change in capacitance is detected (Block 620—yes), a capacitive response may be activated (Block 640). In one implementation, the capacitive response may be configured to alert the system that input has been detected at a particular sensor. For example, if input device 240 is a keyboard, detecting the capacitive response at a particular sensor may indicate that a particular key has been pressed. If input device 240 is a touch screen, detecting the change in capacitance at a particular sensor may indicate that a particular area of the touch screen has been pressed. The particular area of the touch screen may, for example, correspond to a button being displayed, and detecting the change in capacitance may be interpreted as the button being activated by a user. In another implementation, the capacitive response may include such functions as lighting a display, lighting the keys of a keyboard, updating the contents of a document being displayed by contacting the source of a document, answering an incoming call, or silencing a ring tone.

A change in force may then be detected by monitoring for a change in voltage (Block 650). If no change in voltage is detected (Block 650—no), the current force response may be maintained (Block 660). If no previous voltage has been detected, there may be no current force response and no action may need to be taken. If a change in voltage is detected (Block 650—yes), the force response may be adjusted based on the change in voltage (Block 670). The change in voltage may correspond to how hard a user has pressed on input device 240 with a finger, a stylus, or any other item that may be used to touch the input device.

The force response may be configured to control an intensity of an action or the number of objects to include in the action based on the amount in the change of voltage and therefore based on the amount of force detected. The force response may be configured to indicate the degree or intensity of an input action by the user along a continuous spectrum. For example, if input device 240 is a touch screen, the amount of force a user applies with a finger may control the brightness of the touch screen, speed of scrolling through the contents being displayed on the touch screen, the speed of zooming through the contents displayed on the touch screen, how many pages of a virtual book to turn, the speed of an element in a game, or the volume of speaker 130. Some of the examples given above may require that a user move a finger across a part of the input device 240. For example, if the force response is configured to control the speed of scrolling through the contents being displayed, the user may slide a finger across a portion of the display device while applying pressure to indicate the direction of scrolling, where the pressure being applied may determine how fast the displayed contents are scrolled.

The force response may be configured with a discrete set of responses based on the applied force. For example, if input device 240 is a keyboard or a set of keys, different amounts of force may be configured to cause the pressed key to have different functions. For example, for a keyboard, a light touch might cause the keys to function as lower case letters, a medium touch as capital letters, and a heavy touch as control key characters. Alternatively, due to limited space on mobile terminal 100, input device 240 may not be a full keyboard, and each key may be used for multiple letters. In such an implementation, a light touch might cause a key to input one letter, a medium touch might cause a key to input a second letter, and a heavy touch might cause a key to input a third letter.

In one implementation, the capacitive response and the force response may have different functions. For example, if input device 240 is a touch screen, a light touch activating the capacitive response may select a link displayed on the touch screen, while a force response may select text displayed on the touch screen. As another example, a light touch activating a capacitive response may be used to scroll through the contents being displayed, while a touch activating a force response may act to select some of the contents.

Figure 7:
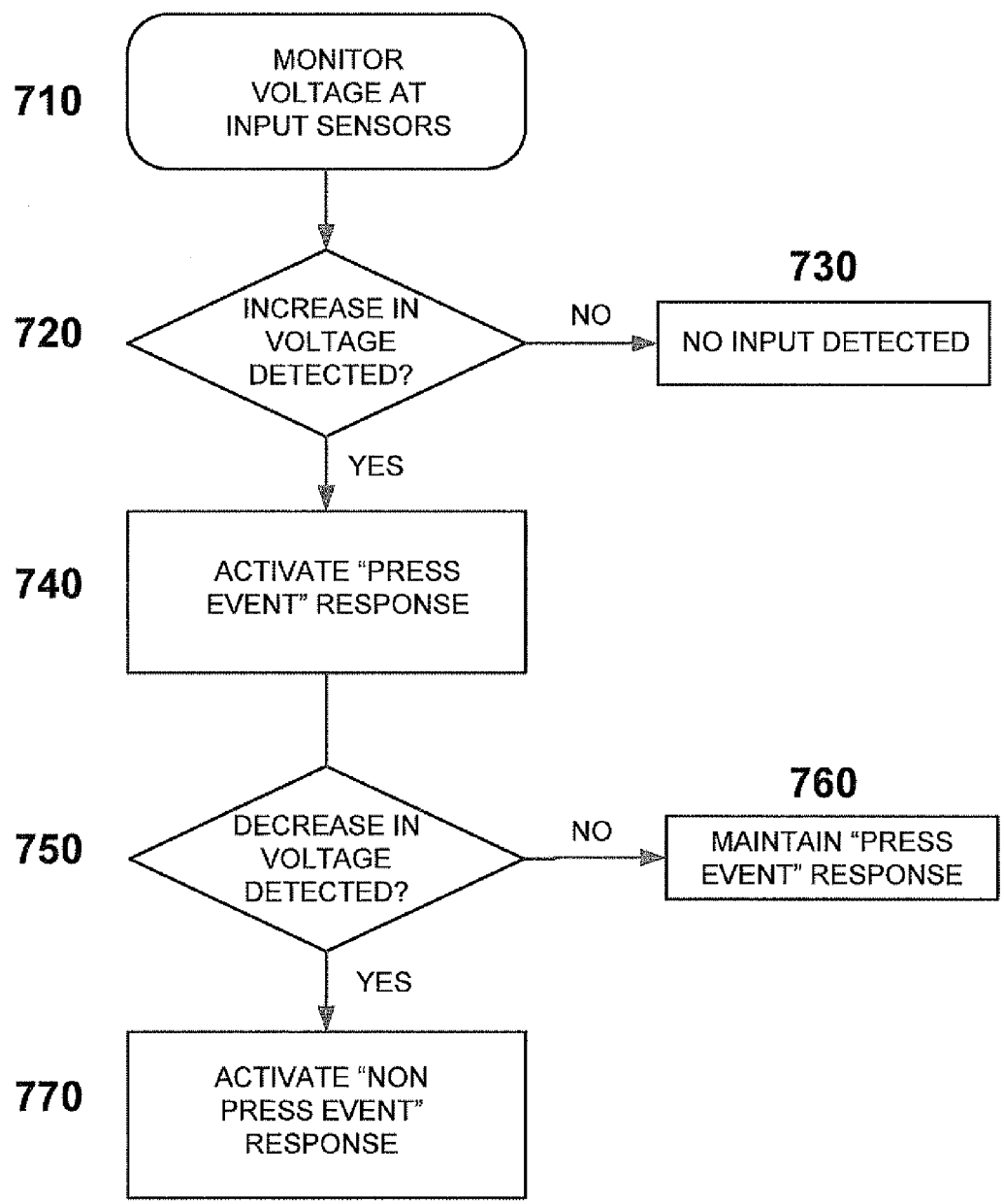
FIG. 7 is a flow diagram illustrating a second exemplary method according to an exemplary implementation.

FIG. 7 is a flow diagram illustrating processing by mobile terminal 100 in another exemplary implementation. One or more of the blocks may be performed by input device 240 or another mobile terminal. Assume input device 240 is in a neutral state, with no user input detected. The voltage of input sensors may be monitored (Block 710). If no increase in voltage is detected (Block 720—no), no input may be detected and no action may be taken (Block 730). If there is an increase in voltage detected (Block 720—yes), a "press event" response may be activated (Block 740).

The "press event" response may be corresponds to a single response. The "press event" may also be correspond to one of possible discrete responses selected based on the amount of increase in voltage, or the "press event" may be correspond to a response on a continuum of responses selected based on the amount of increase in voltage detected. The "press event" may be, for instance, any of the examples given above with reference to FIG. 6.

The system may continue to monitor the voltage. If no decrease in voltage is detected (Block 750—no), the "press event" response may be maintained (Block 760). Alternatively, the "press event" response may be maintained for a particular period of time and then a return to a neutral state. If a decrease in voltage is detected (Block 750—yes), a "non press event" response may be activated. The "non press event" response may, for example, be configured to cease a "press event" response.

In the implementation of FIG. 7, a force sensor of input device 240 may be configured to take advantage of the ability of sensor 305 to detect a "non press event" without the user having to lift a finger or a stylus from the sensor. This may be used to simulate the action of a pointing device, such as a mouse. A mouse is typically implemented so that a single-click, where a user presses a mouse button once, selects or highlights an object (such as a link or a button in a web browser) on a display device, and a double-click, where a user presses a mouse button twice in rapid succession, executes the object. Existing touch screen sensors are unable to implement a double-click action, because a user has to remove the finger or stylus from the touch screen after activating a touch screen sensor. In contrast, sensor 305 is able to detect when a user reduces finger pressure without removing the finger from sensor 305.

A force sensor of input device 240 may be configured to active a single-click action when a "press event" response is followed by a "non press event" response within a particular time period. Force sensor 305 of input device 240 may be configured to activate a double-click action when a "press event" response is followed by a "non press event" response within a first particular time period, followed by a second "press event" response within a second particular time period. Alternatively, force sensor 305 of input device 240 may be configured to activate a double-click action when a "press event" response is followed by a "non press event" response within a first particular time period, followed by a second "press event" response within a second particular time period, followed by a second "non press event" response within a third particular time period. The maximum delay for two consecutive clicks, whereby a double-click is detected by input device 240, may be adjustable by adjusting the first, second, and third particular time periods.

Alternate Exemplary Input Device

Figure 8:
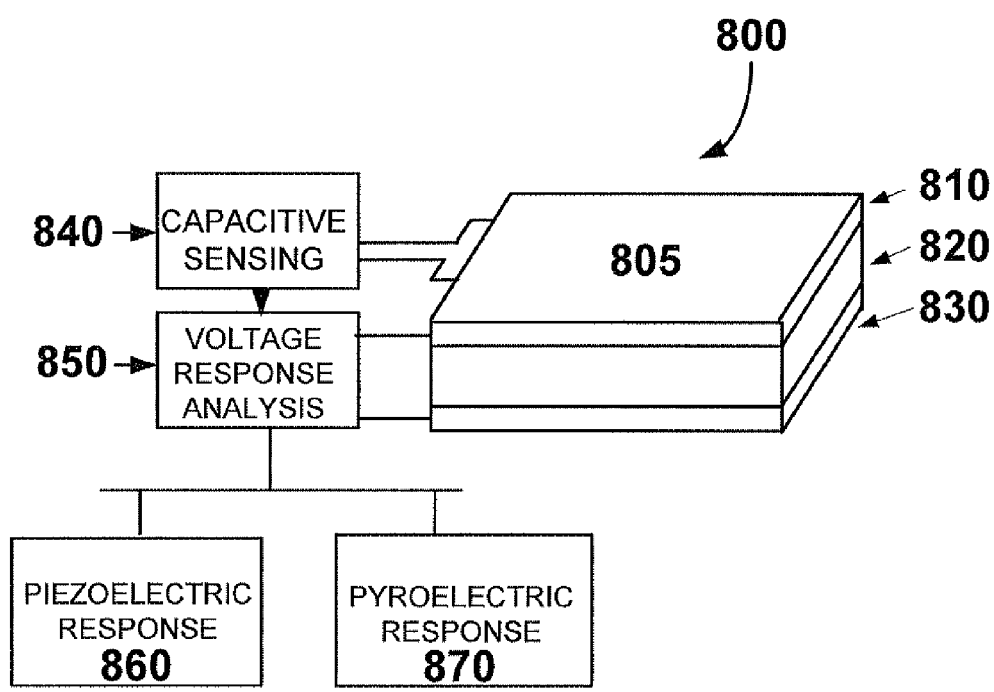
FIG. 8 illustrates a second exemplary input device according to an exemplary implementation.

FIG. 8 illustrates a second exemplary input device 800 according to another exemplary implementation. Device 800 may include a combined analog force and touch sensor 805. Sensor 805 may include top layer 810, force sensing layer 820, and bottom layer 830.

Top layer 810 and bottom layer 830 may be electrode layers, and may include the same material for both layers, or may include a different material for each layer. In one implementation, top layer 810 and bottom layer 830 may include a conductive and optically transparent material, similarly to layers 310 and 330 described above.

Sensor 805 may be configured for combined capacitive touch sensing by configuring layer 810 similarly to layer 310 described above. In addition, sensor 805 may be configured to detect force sensing and temperature sensing. Force sensing layer 820 may include a material having both piezoelectric and pyroelectric properties, such as PDVF, P(VDF-TFE), or P(VDF-TrFE). The piezoelectric properties of layer 820 may be utilized to detect a change in force, by measuring the change in voltage in response to pressure applied to layer 820. The pyroelectric properties of layer 820 may be utilized to detect the proximity of a user's finger, by measuring the change in voltage in response to a change in temperature in layer 820 resulting from IR radiation emitted from a user's finger. The transient voltage response in response to a change in pressure in layer 820 may differ sufficiently from the transient voltage response in response to a radiant heat source near layer 820 to distinguish whether the voltage response was a result of pressure or a result of radiant heat.

Capacitive sensing component 840 may be coupled to top layer 810 and configured to process signals from top layer 810. Capacitive sensing component 840 may include an amplifier for amplifying signals from top layer 810 and be configured to detect changes in capacitance in top layer 810 and activate a capacitive response in mobile terminal system 100 in response to detecting the change in capacitance. Capacitive sensing component 840 may be coupled to an array of sensors 805 and configured to determine which particular sensors in the array of sensors have been activated by a user based on the change in capacitance in the particular sensors. The particular action or series of actions activate by capacitive sensing component 840 in response to detecting a change in capacitance in a particular sensor included in input device 240 may be predetermined during manufacture, set by a user, or depend on an application being executed by mobile terminal 100. Capacitive sensing component 840 may be implemented within processing logic 220, or as a processor, microprocessor, an application specific integrated circuit (ASIC), field programmable gate array (FPGA), or the like, within input device 240.

Voltage response analysis component 850 may be coupled to top layer 810 and bottom layer 830, and configured to detect changes in voltage across sensing layer 820, and may include on or more amplifiers for amplifying signals from sensor 800. Voltage response analysis component 850 may be coupled to an array of sensors and configured to determine which particular sensors in the array of sensors have been activated by a user based on the change in voltage in the particular sensors. Voltage response analysis component 850 may be configured to measure the transient voltage response across sensing layer 820. Based on a measured transient voltage response, voltage response analysis component 850 may determine whether the measured transient voltage corresponds to a radiant heat source or a pressure source. The transient voltage response based on a radiant source, which may correspond to a pyroelectric response of sensing layer 820, may, for example, generate much smaller changes in voltage than the transient voltage response based on pressure, which may correspond to a piezoelectric response of sensing layer 820, and voltage response analysis component 850 may be programmed to distinguish the two responses. In this implementation, voltage response analysis component may include a different amplifier for amplifying the weaker signals based on a pyroelectric response.

In another implementation, a shape of a voltage response curve for a pyroelectric response may differ from a shape of a voltage response curve for a piezoelectric response, and voltage response analysis component 850 may be trained to recognize the different voltage response curves.

In yet another implementation, voltage response analysis component 850 may determine that a voltage response corresponds to a pyroelectric response of sensing layer 820 if capacitive sensing component 840 detect no change in capacitance (indicating a user has not touched sensor 800), and voltage response analysis component 850 may determine that a voltage response corresponds to a piezoelectric response if sensing layer 820 if capacitive sensing component 840 does detect a change in capacitance (indicating a user has touched sensor 800).

Voltage response analysis component 850 may be coupled to a piezoelectric response component 860 and a pyroelectric response component 870. If the voltage response analysis component 850 determines that a transient voltage response corresponds to a pressure source and is the result of a piezoelectric response of sensing layer 820, piezoelectric response component 860 may be activated. Piezoelectric response component 860 may be configured to control an intensity of an action or the number of objects to include in an action based on the amount in the change in voltage and therefore based on the amount of force detected. Piezoelectric response component may be implemented, for example, within processing logic 220.

If the voltage response analysis component 850 determines that a transient voltage response corresponds to a radiant heat source and is the result of a pyroelectric response of sensing layer 820, pyroelectric response component 870 may be activated. Pyroelectric response component 870 may be configured to activate an action or a series of actions in response to a pyroelectric response being detected. Pyroelectric response component may be implemented, for example, within processing logic 220.

Figure 9:
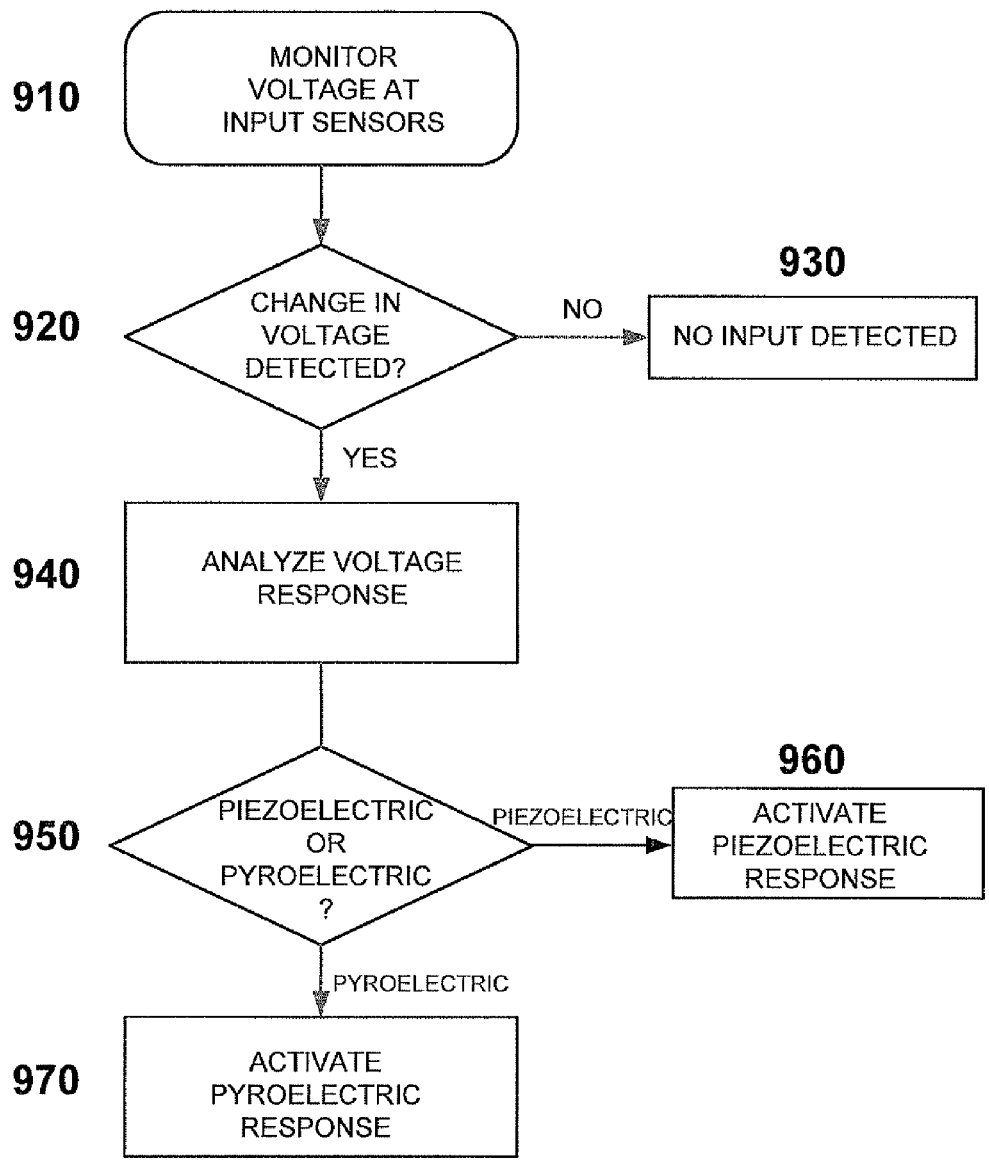
FIG. 9 is a flow diagram illustrating a third exemplary method according to an exemplary implementation.

FIG. 9 is a flow diagram illustrating an exemplary method according to an implementation consistent with FIG. 8. A voltage of input sensors may be monitored (Block 910). Since touches on input device 240 may occur very quickly and very frequently, input device 240 may continuously monitor the voltage of an input sensor. If no change in voltage is detected (Block 920—no), no input may be detected and no action may be taken (Block 930). If there is a change in voltage detected (Block 920—yes), the voltage response may be analyzed (Block 940). It may be determined whether the voltage response is consistent with a piezoelectric voltage response (Block 950—piezoelectric) and a piezoelectric response may be activated (Block 960). It may be determined whether the voltage response is consistent with a pyroelectric response (Block 950—pyroelectric) and a pyroelectric response may be activated (Block 970).

The piezoelectric response and the pyroelectric response may be configured to execute different functions. For example, the pyroelectric response may be configured to light display 140 or keys of input device 240, while the piezoelectric response may be configured for any of the functions given as examples above with reference to FIG. 6. As another example, as a user moves a finger along display 140, the pyroelectric response may be configured to scroll through contents being displayed, while as a user touches display 140, the piezoelectric response may be configured to select contents being displayed. As yet another example, the pyroelectric response may be configured for one set of controls for a game, while the piezoelectric response may be configured for another set of controls for a game. As yet another example, the pyroelectric response may be configured to silence a ring tone, while the piezoelectric response may be configured to answer an incoming call.

The system may also be configured for a capacitive response, a piezoelectric response, and a pyroelectric response. In such a configuration, Block 640 of FIG. 6 may be followed by Block 910 of FIG. 9.

In another implementation, capacitive sensing component 840 may be coupled to voltage response analysis component 850. Voltage response analysis component 850 may determine whether to activate the piezoelectric response or the pyroelectric response (Block 950) based on a capacitive response. For example, if no capacitive response was detected, this may be interpret this as a user not touching the input device, and therefore any voltage change detected may be interpreted as a pyroelectric response. If a capacitive response is detected, this may be interpreted as a user touching the input device, and any voltage change detected may be interpreted as a piezoelectric response, and any voltage changes consistent with a pyroelectric response may be disregarded by voltage analysis component 850.

Conclusion

Implementations described here may provide an input device capable of detecting a user's touch through a change in capacitance and detecting the amount of force a user is applying to the input device by detecting a change in voltage as a result of a piezoelectric response in a sensing layer of the input device. The input device may also be configured to detect a change in voltage as a result of a pyroelectric response in the sensing layer of the input device. While the implementations given above are described in terms of changes in voltage, changes in current may be measured instead.

The foregoing description provides illustration and description, but is not intended to be exhaustive or to limit the invention to the precise form disclosed. Modifications and variations are possible in light of the above teachings or may be acquired from practice of the invention.

Still further, aspects have been mainly described in the context of a mobile terminal. As discussed above, the device and methods described herein may be used with any type of device that includes an input device. It should also be understood that particular materials discussed above are exemplary only and other materials may be used in alternative implementations to generate the desired information.

Further, while series of blocks have been described with respect to FIGS. 6, 7, and 9, the order of the blocks may be varied in other implementations. Moreover, non-dependent blocks may be performed in parallel.

It will also be apparent that aspects described herein may be implemented in methods and/or computer program products. Accordingly, aspects may be embodied in hardware and/or in software (including firmware, resident software, micro-code, etc.). Furthermore, aspects described herein may take the form of a computer program product on a computer-usable or computer-readable storage medium having computer-usable or computer-readable program code embodied in the medium for use by or in connection with an instruction execution system. The actual software code or specialized control hardware used to implement these aspects is not limiting of the invention. Thus, the operation and behavior of the aspects were described without reference to the specific software code—it being understood that software and control hardware could be designed to implement the aspects based on the description herein.

Further, certain aspects described herein may be implemented as "logic" that performs one or more functions. This logic may include hardware, such as a processor, microprocessor, an application specific integrated circuit or a field programmable gate array, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A device, comprising:
   a touch screen configured to sense at least capacitance, force, or a combination of capacitance and force; and
   wherein the touch screen comprise:
      a plurality of sensors located at a plurality of locations;
      a first layer, wherein the first layer is configured as a conductive layer or a screening layer;
      a second layer coupled to the first layer, wherein the second layer is configured to sense force, and
      a third layer configured as a conductive layer or a screening layer;
   a capacitance sensing component coupled to the first layer and the plurality of sensors;
   a force sensing component coupled to the plurality of sensors, the first layer and the third layer,
   wherein the force sensing component is configured to determine which particular sensor of the plurality of sensors has been activated and to detect an amount of force applied to the second layer, and
   wherein the force sensing component generates one of a plurality of force responses, from a set of force responses in response to the force exerted on the particular sensor associated with one of the plurality of locations,
   wherein the force response is based on at least one of a detected amount of force sensed or a duration of force exerted on the particular sensor, and
   wherein different areas of the touch screen are configured to have different sensitivities to touch, and wherein the different sensitivities to touch are adjustable.

2. The device of claim 1, where the second layer comprises a piezoelectric, optically transparent material.

3. The device of claim 2, where the second layer comprises one of polyvinylidene fluoride, poly(vinylidene-trifluoroethylene), poly(vinylidene-tetrafluoroethylene), or two or more of polyvinylidene fluoride, poly(vinylidene-trifluoroethylene), and poly(vinylidene-tetrafluoroethylene).

4. The device of claim 1, where the first and third layer comprise a conductive, optically transparent material.

5. The device of claim 4, where the first and third layers comprise one of indium tin oxide, aluminum-doped zinc oxide, carbon nanotubes, Poly(3,4-ethylenedioxythiophene), or Poly((3,4-ethylenedioxythiophene)-poly(styrene-sulfonate).

6. The device of claim 1, where the force sensing component is configured to execute a plurality of actions, where each of the plurality of actions is different and is executed in response to a different amount of force detected.

7. The device of claim 6, where each of the plurality of actions corresponds to a different degree of the same action.

8. The device of claim 1, where the force sensing component is configured to control an intensity of an action or the number of objects to include in the action.

9. An input device comprising an array of devices according to claim 1.

10. A mobile terminal comprising an input device according to claim 9.

11. The input device of claim 9, where the input device is a button, a touch screen, a keyboard, a key pad, or a scroll wheel.

12. The device of claim 1, wherein the capacitance sensing component is configured to execute an action or series of actions selected by a user based on the different areas and different sensitivities.

13. The device of claim 1, comprising
    a user interface, wherein a user configures via the user interface the sensitivities to touch of the device.

\* \* \* \* \*